US012520068B2

(12) United States Patent
Sung et al.

(10) Patent No.: US 12,520,068 B2
(45) Date of Patent: Jan. 6, 2026

(54) CONDENSER MICROPHONE CAPSULE SUSPENSION STRUCTURE

(71) Applicant: Logitech Europe S.A., Lausanne (CH)

(72) Inventors: Tzyy-Woei R. Sung, Los Angeles, CA (US); Clayton Christopher Williamson, Moorpark, CA (US); Adam Kirk Bennett, Ventura, CA (US); Aron Michael Rosenberg, Lafayette, CA (US)

(73) Assignee: Logitech Europe S.A., Lausanne (CH)

( * ) Notice: Subject to any disclaimer, the term of this patent is extended or adjusted under 35 U.S.C. 154(b) by 210 days.

(21) Appl. No.: 18/241,018

(22) Filed: Aug. 31, 2023

(65) Prior Publication Data

US 2025/0080890 A1 Mar. 6, 2025

(51) Int. Cl.
*H04R 1/04* (2006.01)
*H04R 19/04* (2006.01)

(52) U.S. Cl.
CPC ............... *H04R 1/04* (2013.01); *H04R 19/04* (2013.01)

(58) Field of Classification Search
CPC . H04R 1/04; H04R 19/04; H04R 1/02; H04R 1/021; H04R 1/025; H04R 1/026028; H04R 5/027; H04R 2201/02; H04R 2201/029; H04R 1/28; H04R 1/2869; H04R 1/2884; H04R 1/2892; H04R 1/08; H04R 1/083
See application file for complete search history.

(56) References Cited

U.S. PATENT DOCUMENTS

| | | | | | |
|---|---|---|---|---|---|
| 2,299,558 | A * | 10/1942 | Mundel | H04R 25/04 381/322 |
| 4,514,598 | A * | 4/1985 | Plice | H04R 1/08 248/104 |
| 2007/0195983 | A1* | 8/2007 | Klemme | H04R 21/02 381/361 |
| 2010/0260347 | A1* | 10/2010 | Baggs | H04R 3/007 381/119 |
| 2011/0007925 | A1* | 1/2011 | Akino | H04R 1/04 381/369 |
| 2014/0153739 | A1* | 6/2014 | Wiederholt | H04R 1/02 381/91 |
| 2018/0234752 | A1* | 8/2018 | Slaton | F16F 15/08 |
| 2025/0014565 | A1* | 1/2025 | Terpstra | G10K 11/28 |

* cited by examiner

*Primary Examiner* — Mark Fischer
(74) *Attorney, Agent, or Firm* — Patterson + Sheridan, LLP

(57) ABSTRACT

Embodiments of the disclosure include a microphone capsule suspension assembly for use in a microphone assembly that includes a capsule mount configured to support a condenser microphone capsule, and a pair of mounting arms. The pair of mounting arms comprise a first mounting arm and a second mounting arm. The first mounting arm includes a first end, a second end and a central portion disposed between the first end and the second end. The second mounting arm includes a third end, a fourth end and a central portion disposed between the third end and the fourth end. The capsule mount is coupled to, and disposed between, the central portions of the first mounting arm and the second mounting arm. The first end, second end, third end, and fourth end each comprise clamping structure, wherein the clamping structures are each configured to be supported by a portion of a housing that is configured to support the microphone capsule suspension assembly.

18 Claims, 9 Drawing Sheets

CONDENSER MICROPHONE CAPSULE SUSPENSION STRUCTURE

BACKGROUND

Field

Embodiments of the present invention generally relate to a microphone capsule assembly and a microphone system.

Description of the Related Art

Condenser microphones convert acoustic signals into electrical signals. They are generally more sensitive to vibrations and other external dynamic motion effects than other types of microphones, such as voice coil based dynamic microphones, and they can detect more nuances in the acoustic signal. This sensitivity makes them well-suited for recording vocals and acoustic instruments.

The general structure of a condenser microphone consists of a capsule and a mounting. The capsule includes a diaphragm, a back-plate, and circuitry to convert the acoustic signals into electrical signals. The condenser microphone is typically able to detect acoustic signals using a polar pattern, such that the microphone is able to detect sound from different directions. Condenser microphones typically have a cardioid polar pattern, meaning they are most sensitive to acoustic signals received from the front of the microphone and reject acoustic signals from the rear. The mounting allows the microphone to be attached to a stand, a boom arm, or directly to a sound recording device.

Suspension systems are used in condenser microphones to isolate the capsule from mechanical vibrations. Mechanical vibrations and dynamic motion effects, such as physical impacts on the microphone body, can cause the diaphragm to vibrate and introduce unwanted noise into the audio signal. However, current suspension systems are bulky, adding weight and size to the microphone, absorb some of the sound waves that hit the diaphragm, and often include unwanted resonant frequencies disposed within an audible range of a human's hearing.

Accordingly, there is a need for a suspension system for a condenser microphone that solves the problems described above.

SUMMARY

Embodiments of the present invention generally relate to a microphone capsule assembly and a microphone system.

In an embodiment, a microphone capsule suspension assembly is provided. The microphone capsule suspension assembly includes a capsule mount configured to support a microphone capsule, and a pair of mounting arms. The pair of mounting arms include a first mounting arm and a second mounting arm, where the first mounting arm includes a first end, a second end and a central portion disposed between the first end and the second end. The second mounting arm includes a third end, a fourth end and a central portion disposed between the third end and the fourth end. The capsule mount is coupled to, and disposed between, the central portions of the first mounting arm and the second mounting arm. The first end, second end, third end, and fourth end each include a clamping structure. The clamping structures are each configured to be supported by a portion of a housing that supports the microphone capsule suspension assembly.

In another embodiment, a microphone assembly is provided. The microphone assembly includes a microphone capsule suspension assembly. The microphone capsule assembly includes a capsule mount that has a capsule mount body configured to support a microphone capsule, a first mounting arm coupled to a first portion of the capsule mount body disposed on a first side of the capsule mount body, and a second mounting arm coupled to a second portion of the capsule mount body disposed on a second side of the capsule mount body. The microphone capsule assembly further includes a first clamping structure disposed on a first end of the first mounting arm, a second clamping structure disposed on a second end of the first mounting arm, a third clamping structure disposed on a first end of the second mounting arm, and a fourth clamping structure disposed on a second end of the second mounting arm.

In yet another embodiment, a microphone capsule suspension assembly is provided. The microphone capsule suspension assembly includes a capsule mount configured to support a microphone capsule, and a plurality of mounting arms. The plurality of mounting arms include a first mounting arm and a second mounting arm. The first mounting arm includes a first end and a first central portion, the second mounting arm includes a second end and a second central portion. The capsule mount is coupled to the first central portion of the first mounting arm and the second central portion of the second mounting arm. The first end of the first mounting arm and the second end of the second mounting arm each include a clamping structure, each configured to be supported by a portion of a housing that supports the microphone capsule suspension assembly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
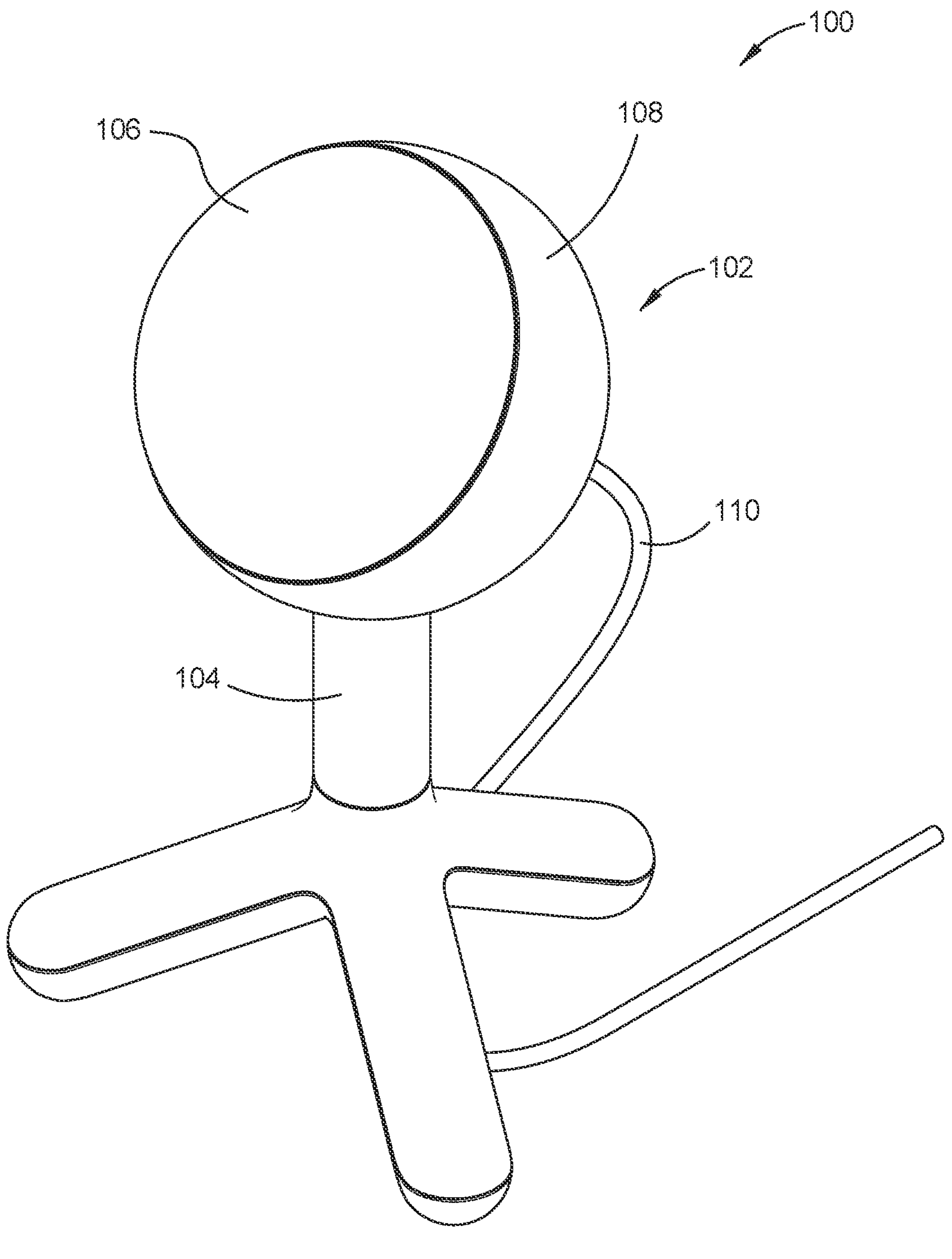
FIG. 1 illustrates a perspective view of a microphone assembly, according to certain embodiments.

Embodiments herein are generally directed to a microphone assembly and a microphone system that is configured to support a condenser microphone during use. More particularly, to systems and methods for improved support structures, e.g., suspensions, for use with condenser microphones.

Suspensions are used within a condenser microphone to isolate the condenser microphone capsule from mechanical vibrations and physical impacts imparted on the microphone assembly. Mechanical vibrations and physical impacts on the body of the microphone assembly can cause the supporting structure and microphone diaphragm to vibrate, which can introduce unwanted noise into the audio signal. The amount of generated noise can be especially undesirable where the structure that supports the condenser microphone capsule includes a resonant frequency that is within the audible range of the sound that the condenser microphone capsule is intended to capture during use. Suspensions are often made of a soft and flexible material, and are placed between the capsule and the supporting structure of the microphone housing. This allows the suspension to support and absorb mechanical vibrations and physical impacts received by and transmitted through the microphone housing. Suspensions may be external or internal. External suspensions are mounted on the outside of the microphone housing, and they are typically made of a thicker material, which may be costlier and bulkier. Internal suspensions are mounted inside the microphone housing, and they are typically made of a thinner material.

However, conventional suspensions are bulky, adding weight and size to the microphone, absorb some of the sound waves that hit the diaphragm, and often include unwanted resonant frequencies disposed within an audible range of a human's hearing, and thus produce undesirable frequency responses to sounds received in parts of the audible range. In general, resonant frequencies of a simple mechanical structure can be determined by:

$$f = \frac{1}{2\pi}\sqrt{\frac{k}{m}}, \quad \text{(Equation 1)}$$

where "k" is the spring constant (e.g., stiffness of the supporting system) and "m" is the mass of the vibrating portion of the supporting system, such as the capsule and a portion of its supporting structure. This is known as the suspended resonance frequency. Frequencies greater than this suspended resonance frequency are known as the mass controlled region, and are characterized by a high degree of isolation between the capsule and supporting structure. In contrast, frequencies lower than the suspended resonance are known as the stiffness controlled region, and are characterized by a low degree of isolation between the capsule and supporting structure. Since the mass (m) of the a condenser microphone capsule is typically small, the suspended resonant frequencies of most condenser microphone containing systems that utilize condenser microphone will be higher in the audible frequency range versus a voice coil (e.g., dynamic diaphragm microphones) type of microphones assembly, due to the larger mass of the diaphragm coupled components in the voice coil microphone designs, such as the voice coils themselves and related magnets required to allow the voice coil microphones to function. As a result of the low capsule mass, to achieve a high degree of isolation so that the device is resistant to external vibrations, it is necessary to have suspension with a very low stiffness. There are some important considerations in this design: First, it must offer low stiffness axially, but high stiffness laterally. This is needed to allow good isolation in the direction of diaphragm motion, where the capsule is extremely sensitive to motion, while preventing tilting, rocking, or other unstable motion that might cause collisions with nearby internal structures.

In some embodiments of the disclosure herein, it is desirable to design the suspension structure so that any developed resonant frequencies are less than 100 hertz (Hz), since the audible range of most human voices is greater than 100 Hz. In one example, the suspension structure is designed so that it has a desirable structural shape, as disclosed herein, and is formed from a material that it adapted to prevent the formation of resonant frequencies in the suspension structure that are greater than 100 Hz, or in resonant frequencies that are greater than 80 Hz, or in resonant frequencies that are greater than 40 Hz, even in resonant frequencies that are greater than 20 Hz. In some embodiments, the suspension structure disclosed herein is less stiff than conventional microphone capsule designs and utilizes materials that have higher damping coefficients so that a better sound quality can be provided as a signal output by the microphone assembly.

To address these issues, the present disclosure provides a support structure for a condenser microphone including a suspension mounted to a clamp assembly. The suspension includes a pair of mounting arms with a clamping structure disposed on the respective ends of each of the mounting arms of the suspension. In some embodiments, the clamping structures are angled in a symmetrical, mirrored fashion along an x-axis and a y-axis such that each clamping structure is a mirror of the adjacent clamping structure. Further, the mounting arms are each configured to have a stiffness that allows for flexibility of the suspension to support the microphone capsule while improving its effective damping of vibrations received from the microphone housing to the microphone capsule. The vibrations received by the microphone capsule causes oscillations in the diaphragm of the microphone capsule, which are picked up by the signal detection components (e.g., diaphragm movement detection components) of the microphone capsule, and thus cause distortion at one or more frequencies in the sound detected by the microphone.

FIG. 1 illustrates a perspective view of a condenser microphone assembly 100. The condenser microphone assembly 100 includes a microphone housing 102 removably coupled to a stand 104. The microphone housing 102 is configured to house microphone components (not shown), such as a capsule mount assembly (not shown) and a microphone capsule suspension assembly (not shown). In some embodiments, the microphone housing 102 includes a covering 106 coupled to a cap portion 108. The covering 106 may be made of fabric or foam and is disposed over a diaphragm (not shown) of a microphone capsule (not shown) disposed within the microphone housing 102 and is acoustically transparent, allowing acoustic waves to permeate the covering 106 and reach the diaphragm. The acoustic waves are then converted into electrical signals within the microphone capsule (e.g., item 302 in FIGS. 3A-3D), which is often referred to herein as simply a "capsule." In one embodiment, the microphone capsule includes a front face 302A that is positioned parallel to a diaphragm, or membrane, and perpendicular to the axis of motion of a diaphragm or the deformation direction of the membrane in response to a received audible input signal (e.g., sound generated from a source). The axis of motion of a diaphragm (not shown) is generally parallel to the center axis 214 illustrated in FIGS. 2A and 3A. In one configuration, the microphone capsule in the condenser microphone assembly 100 are 14 millimeters (mm) in diameter, but other sizes can be used. In some embodiments, the microphone capsule has a mass that is between about 1.5 grams (g) and about 2.5 g.

The microphone housing 102 may be connected to an external controller (not shown) via a controller cable 110. The controller cable may simultaneously provide power to the condenser microphone assembly 100 and provide various electrical signals to the controller, such as a signal from the microphone capsule that includes information relating to sound detected over an audible range. In some embodiments, the audible range that can be detected by the microphone capsule includes frequencies between about 20 Hz and 20,000 Hz, such as frequencies between about 80 Hz and 16,000 Hz.

Figure 2A:
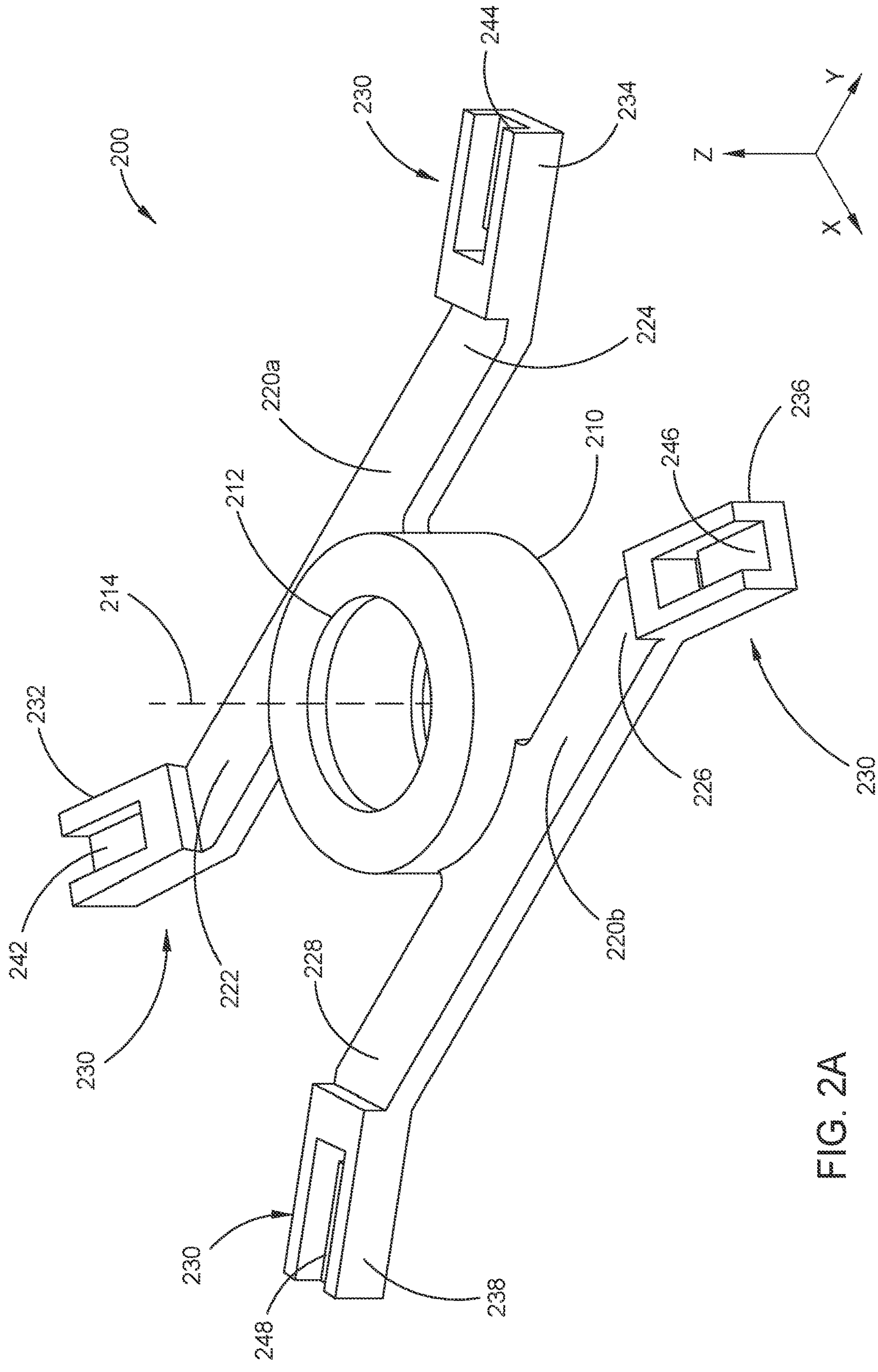
FIG. 2A illustrates a schematic, perspective view of a microphone capsule supporting assembly, according to certain embodiments.
Figure 2B:
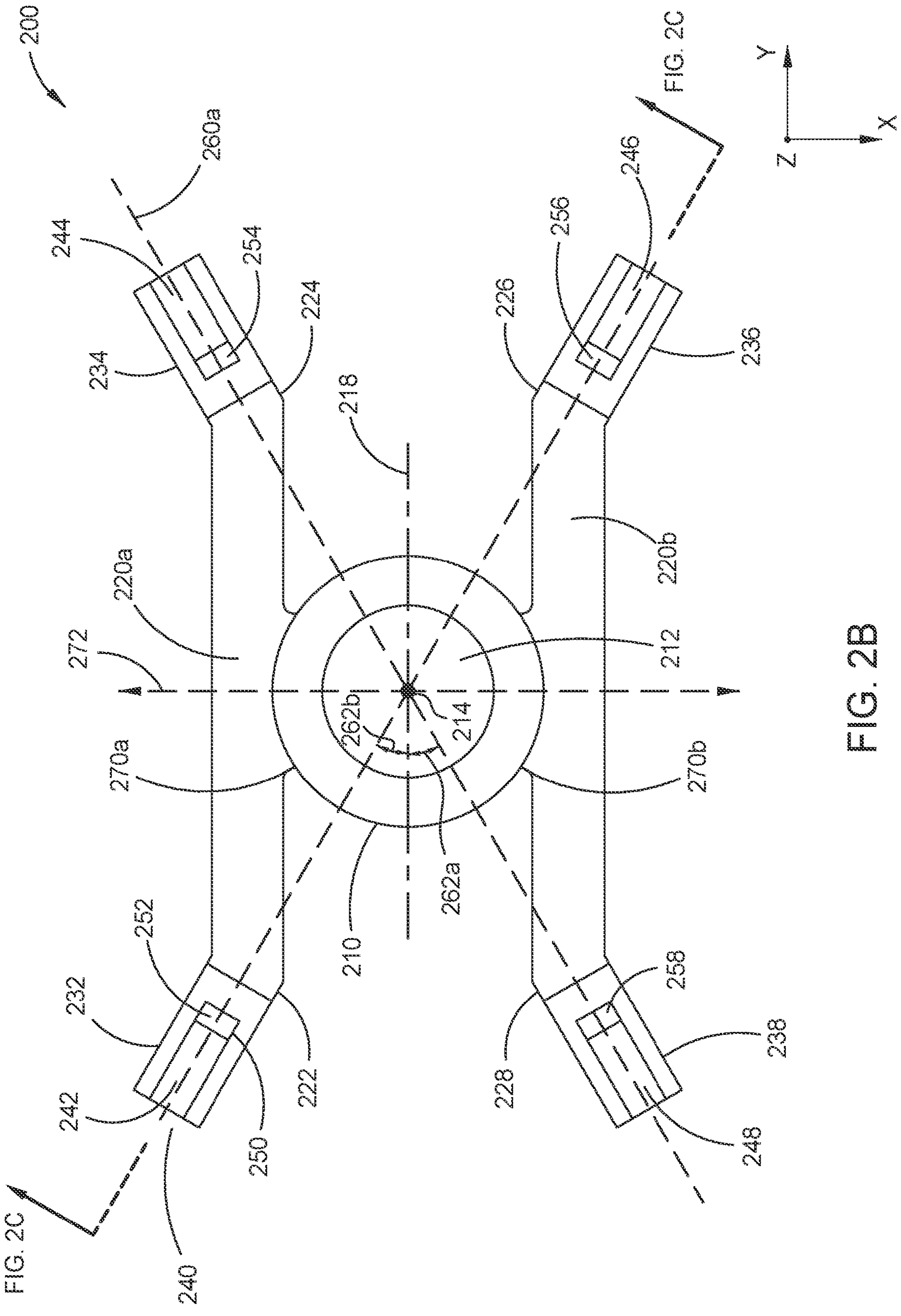
FIG. 2B illustrates a top view of the microphone capsule suspension assembly of FIG. 2A, according to certain embodiments.
Figure 2C:
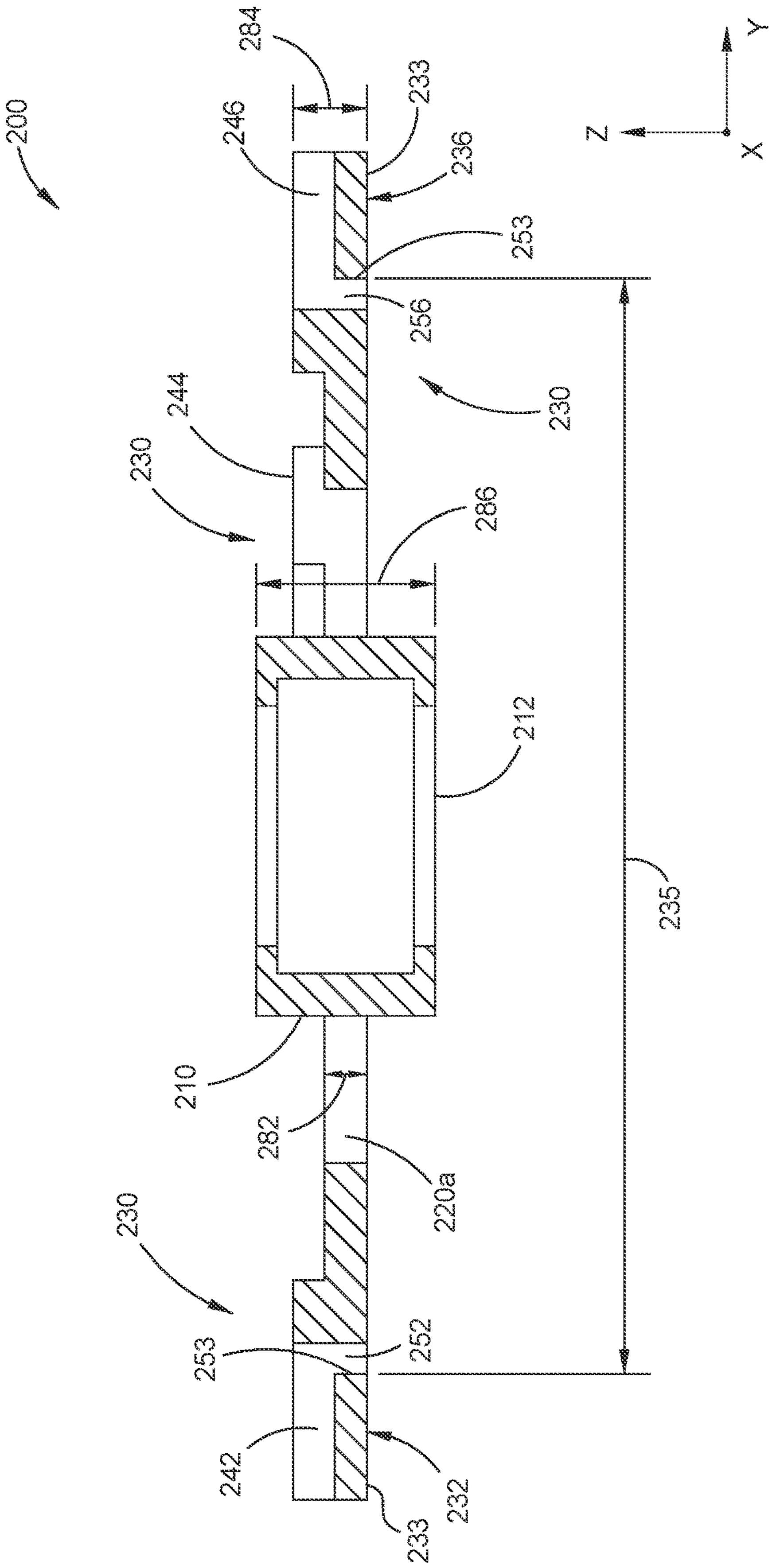
FIG. 2C illustrates a schematic, cross-sectional view of the microphone capsule suspension assembly of FIG. 2A, according to certain embodiments.

FIGS. 2A-2C illustrate views of a microphone capsule suspension assembly 200 configured to hold a capsule within the microphone housing 102. FIG. 2A illustrates a perspective view of the microphone capsule suspension assembly 200 for a condenser microphone. FIG. 2B shows a top view of the microphone capsule suspension assembly 200, and FIG. 2C shows a schematic, cross-sectional view of the microphone capsule suspension assembly 200 formed by use of the sectioning line 2C-2C in FIG. 2B. The microphone capsule suspension assembly 200 includes a capsule mount 210 that has a cylindrical body with a mount aperture 212 disposed concentrically about a center axis 214. The radius of mount aperture 212 is less than the radius of capsule mount 210 such that a base portion 216 of the capsule mount 210 may be configured to support a capsule. The microphone capsule suspension assembly 200 further includes a pair of mounting arms, e.g., first mounting arm 220*a* and second mounting arm 220*b* coupled to the capsule mount 210. The first mounting arm 220*a* includes a first mounting arm bend 222 disposed on one end of the first mounting arm 220*a* and a second mounting arm bend 224 on an opposing end along a length of the first mounting arm 220*a*. A central region of the first mounting arm 220*a* is disposed between the first mounting arm bend 222 and the second mounting arm bend 224. The first mounting arm bend 222 and second mounting arm bend 224 are then coupled to a plurality of clamping structures 230 formed at the opposing ends of the mounting arms, such as first clamping structure 232 and second clamping structure 234. The first clamping structure 232 and the second clamping structure 234 are disposed adjacent to the first mounting arm bend 222 and the second mounting arm bend 224, respectively.

The second mounting arm 220*b* is configured similarly with a third mounting arm bend 226 disposed on one end of the second mounting arm 220*b* and coupled to a third clamping structure 236 disposed adjacent to the third mounting arm bend 226 and a fourth mounting arm bend 228 on an opposing end of the second mounting arm 220*b* and coupled to the fourth clamping structure 238 disposed adjacent to the fourth mounting arm bend 228. A central region of the second mounting arm 220*b* is disposed between the third mounting arm bend 226 and the fourth mounting arm bend 228.

As shown in FIG. 2B, the microphone capsule suspension assembly 200 includes a longitudinal center plane 218 that passes through and is coaxial with the center axis 214. The plurality of clamping structures 230 include clamping axes that pass through the center axis 214 and are each rotated from the longitudinal center plane 218 by clamping angles. The second clamping structure 234 and the fourth clamping structure 238 form a first clamping axis 260*a* while the first clamping structure 232 and the third clamping structure 236 form a second clamping axis 260*b*. The first clamping axis 260*a* is rotated from longitudinal center plane 218 by a first clamping angle 262*a*. The second clamping axis 260*b* is rotated from the longitudinal center plane 218 by a second clamping angle 262*b*. In one embodiment, the first clamping angle 262*a* and the second clamping angle 262*b* are congruent angles and are equal to or less than 90 degrees from the longitudinal center plane 218 on opposing sides of the longitudinal center plane 218, e.g., the first clamping angle 262*a* is on one side of the longitudinal center plane 218 and the second clamping angle 262*b* is on an adjacent, opposing side of the longitudinal center plane 218 (i.e., Y-Z plane). Alternatively, the first clamping angle 262*a* and the second clamping angle 262*b* may be different values from each other.

In one embodiment, as illustrated in FIG. 2B, the first mounting arm 220*a* and the second mounting arm 220*b* are coupled tangentially to the capsule mount 210 and are positioned on opposing sides of the cylindrical body of the capsule mount 210. A first arm extension 270*a* connects the first mounting arm 220*a* to a first side of the capsule mount 210 while a second arm extension 270*b* connects the second mounting arm 220*b* to an opposing second side of the capsule mount 210. The first arm extension 270*a* extends from a center portion of the first mounting arm 220*a* and the second arm extension 270*b* extends from a center portion of the second mounting arm 220*b*. The first arm extension 270*a* and the second arm extension 270*b* are aligned along an extension axis 272 that is perpendicular to the longitudinal center plane 218 to achieve lateral symmetry (e.g., X-direction and Y-direction) between the first mounting arm 220*a* and the second mounting arm 220*b*. In some embodiments, the center of mass of the capsule mount 210 is coincident with a point on the center axis 214, and also coincident with a lateral plane (i.e., x-y plane) that is positioned at a mid-point of the thickness (e.g., arm thickness 282 (FIG. 20)) of the weight supporting portions of the first and second mounting arms 220*a*, 220*b*, when the thickness is measured in the vertical direction (i.e., z-direction). The symmetrical nature of the first mounting arm 220*a* and second mounting arm 220*b* is configured to prevent rotation of the capsule mount 210 when external forces, e.g., air flow or mechanical vibrations, act on the microphone capsule suspension assembly 200. It is believed that the structural configurations disclosed herein are useful to prevent undesirable vibration induced mode shapes, which in some cases can cause distortion of the microphone capsule suspension assembly 200 and diaphragm of the microphone capsule during use. Preventing rotation and/or other types of distortions of the microphone capsule suspension assembly 200 will result in an improved capsule sound reproduction performance and acoustic signal integrity.

In FIG. 2C, a cross-sectional view of the microphone capsule suspension assembly 200 is shown. The first mounting arm 220*a* and the second mounting arm 220*b* include an arm thickness 282, which are uniform and equal to each other. Each of the plurality of clamping structures 230, e.g., first clamping structure 232 and third clamping structure 236 shown in FIG. 2C, include a clamping structure thickness 284 that are uniform and equal to each other. The clamping structure thickness 284 of the plurality of clamping structures 230 is greater than the arm thickness 282 of both the first mounting arm 220*a* and the second mounting arm 220*b*. The capsule mount 210 includes a capsule mount width 286 that is uniform across the cylindrical body of capsule mount 210. The capsule mount width 286 is larger than clamping structure thickness 284 and arm thickness 282. For example, the capsule mount width 286 may have a width ratio to the arm thickness 282 of about 5:1, or greater. Further the clamping structure thickness 284 may have a width ratio to the arm thickness 282 of about 2.25:1, but less than the width ratio of the capsule mount width 286 to the arm thickness 282.

In some embodiments, each of the first mounting arm 220*a* and the second mounting arm 220*b* may be made of a material having a Shore A hardness of between about 20 and 50, such as about 30 and 40, and preferably about 35. A hardness in these ranges allows for the first mounting arm 220*a* and the second mounting arm 220*b* to be taught enough to support and secure a capsule in a microphone assembly while soft enough to provide effective dampening through the microphone capsule suspension assembly 200. For example, the material may be butyl rubber. However, in some cases the material may be a polyurethane or a silicone. The capsule mount is made of a material having a Shore A hardness of between about 30 and about 40, and preferably about 35. The capsule mount 210 may also be made of the same or similar materials as the pair of mounting arms 220. For example, the capsule mount 210 and the pair of mounting arms 220 may be a single piece. Alternatively, the capsule mount 210 may be made of a different material than then pair of mounting arms 220 and could be bonded to the pair of mounting arms 220.

In one embodiment, the material used to form the microphone capsule suspension assembly 200 includes a material that has a tensile modulus (Young's modulus) of between about 7.5 megapascals (MPa) and about 12 MPa. In some embodiments, the material used to form the microphone capsule suspension assembly 200 includes a material that has a loss factor $\eta$ of between about 0.5 and about 5. In one embodiment, the material used to form the microphone capsule suspension assembly 200 includes a material that has a glass transition temperature of at least 20° C. or less, such as less than 10° C., or less than about −60° C. The material properties can be measured using procedures outlined in ASTM standard D4092. It has been found that utilizing materials that have the material properties described herein are able to effectively support and dampen the vibrations imparted on the microphone assembly, such that resonant frequencies were found to be below a 100 Hz, such as less than 80 Hz, or less than 40 Hz. In one example, the material includes butyl rubber.

Figure 3A:
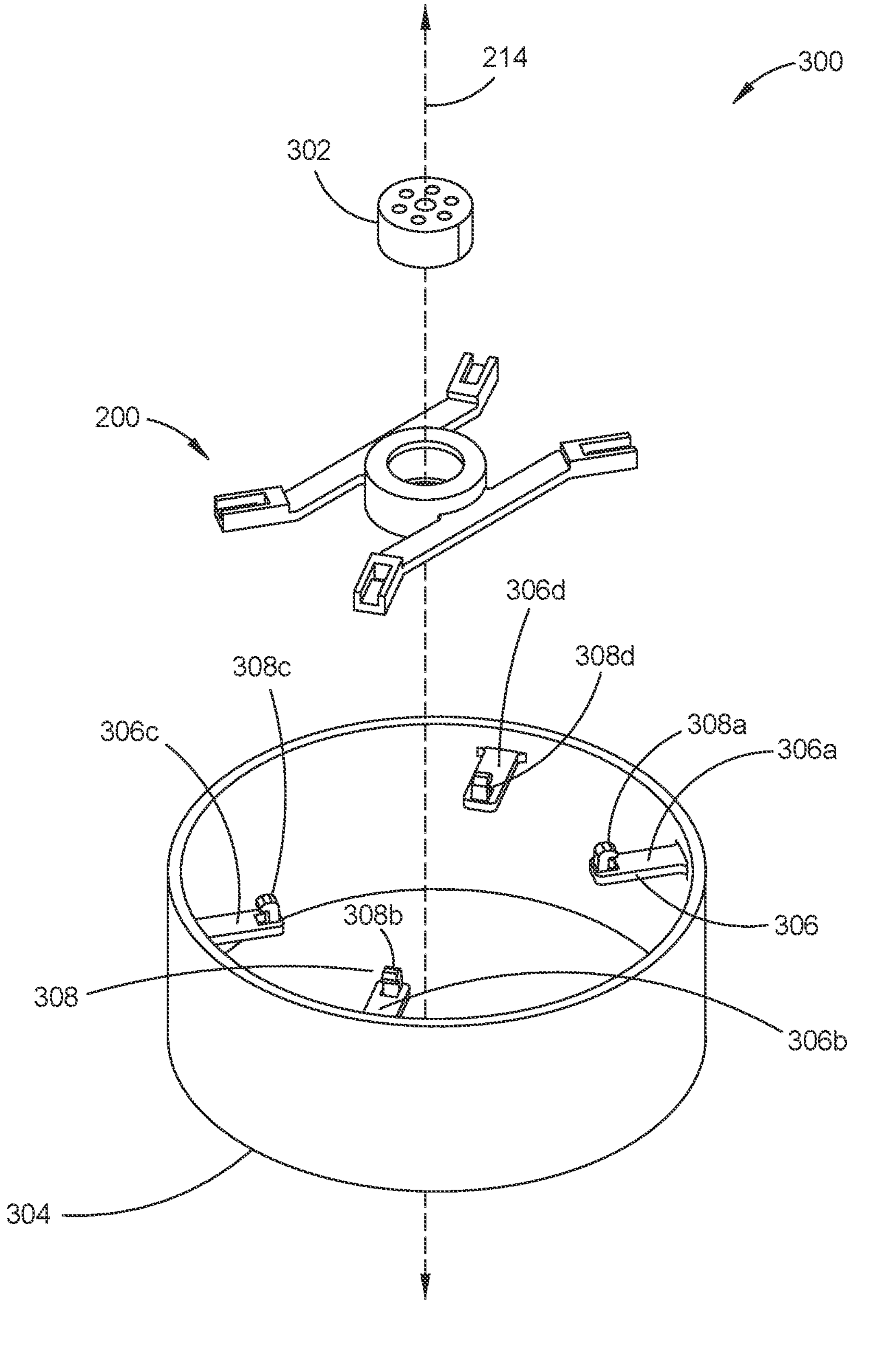
FIG. 3A illustrates an exploded view of a capsule mount assembly, according to certain embodiments.
Figure 3B:
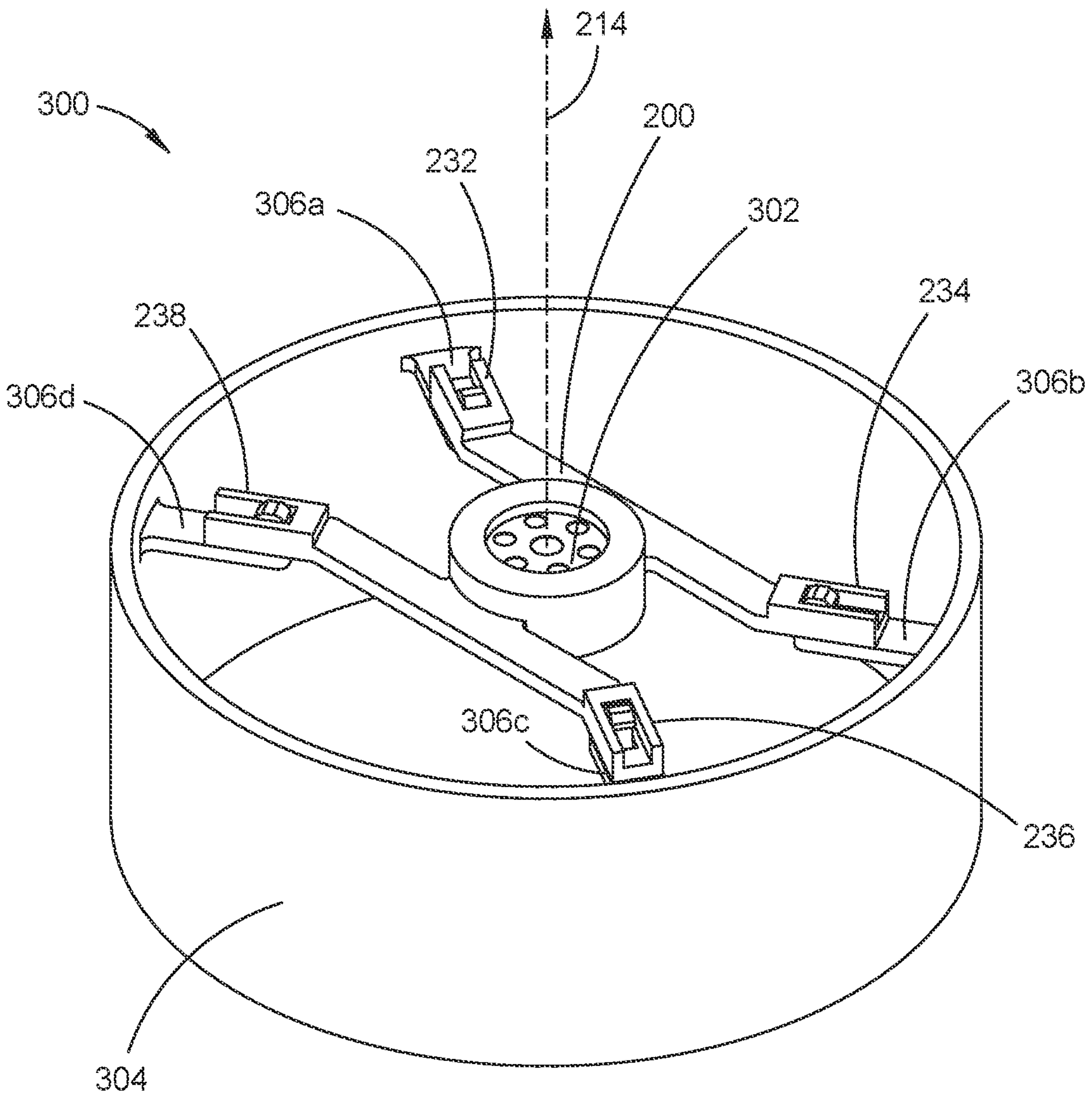
FIG. 3B illustrates a perspective view of the capsule mount assembly of FIG. 3A, according to certain embodiments.

FIGS. 3A-3D illustrate a mounting assembly 300 incorporating the microphone capsule suspension assembly 200. FIG. 3A illustrates an exploded view of the mounting assembly 300 that includes a 302 disposed within the capsule mount 210 of the microphone capsule suspension assembly 200 and a housing 304. The housing 304 includes a plurality of housing mounts 306 disposed within an inner surface of the housing 304 and are configured to engage with the microphone capsule suspension assembly 200. FIG. 3B illustrates a perspective view of an assembled mounting assembly 300. The 306, such as first housing mount 306*a*, second housing mount 306*b*, third housing mount 306*c*, and fourth housing mount 306*d*, are aligned to engage with the first clamping structure 232, the second clamping structure 234, the third clamping structure 236, and the fourth clamping structure 238, respectively. When assembled, the microphone capsule suspension assembly 200 rests near one end of the housing 304 to improve airflow through the mounting assembly 300. This positioning allows the capsule mount 210 to closer to the covering 106 for improved overall performance of the condenser microphone assembly 100.

Figure 3C:
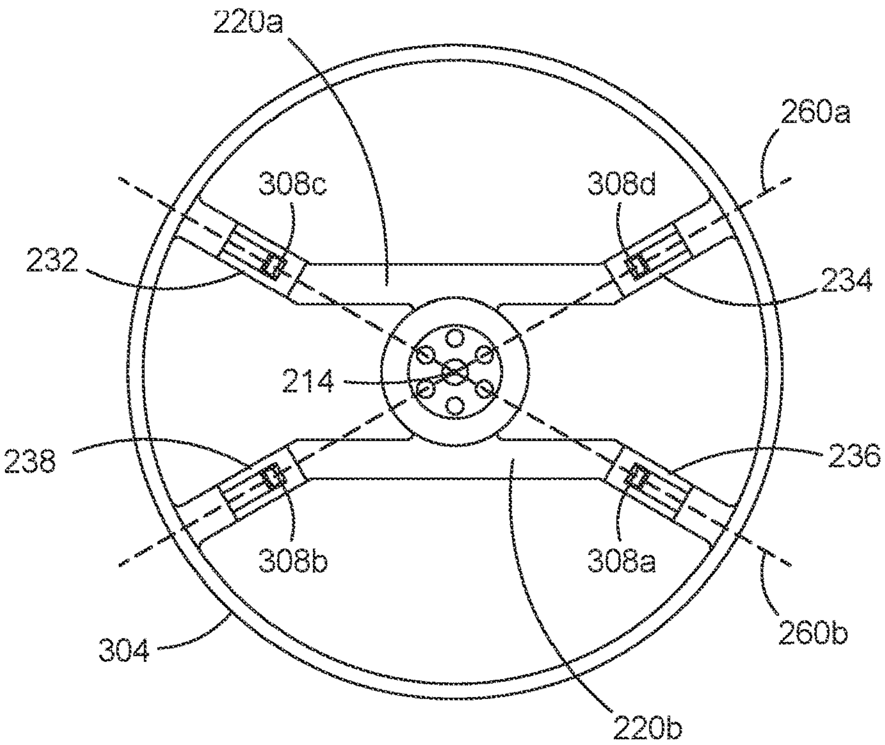
FIG. 3C illustrates a top view of the capsule mount assembly of FIG. 3A, according to certain embodiments.
Figure 3D:
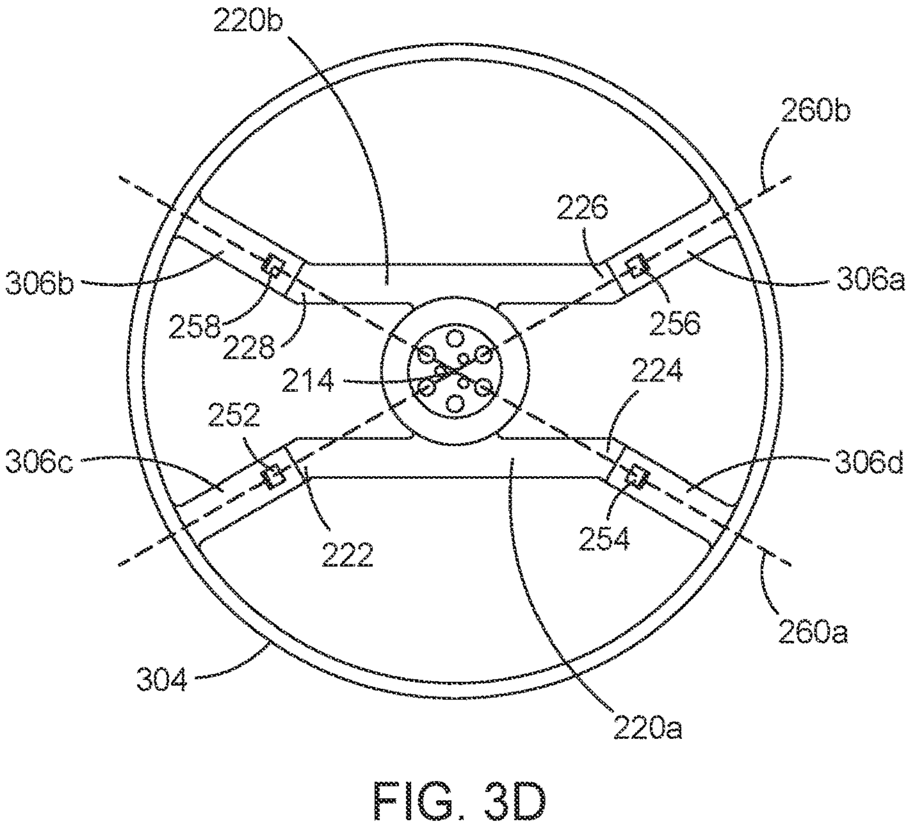
FIG. 3D illustrates a bottom view of the capsule mount assembly of FIG. 3A, according to certain embodiments.

FIGS. 3C and 3D are top and bottom views, respectively, of the mounting assembly 300. The plurality of housing mounts 306 with a plurality of protrusions 308 extending therefrom are aligned along the first clamping axis 260*a* and second clamping axis 260*b* to match with the plurality of clamping structures 230 and secure the microphone capsule suspension assembly 200 to the housing 304.

Figure 3E:
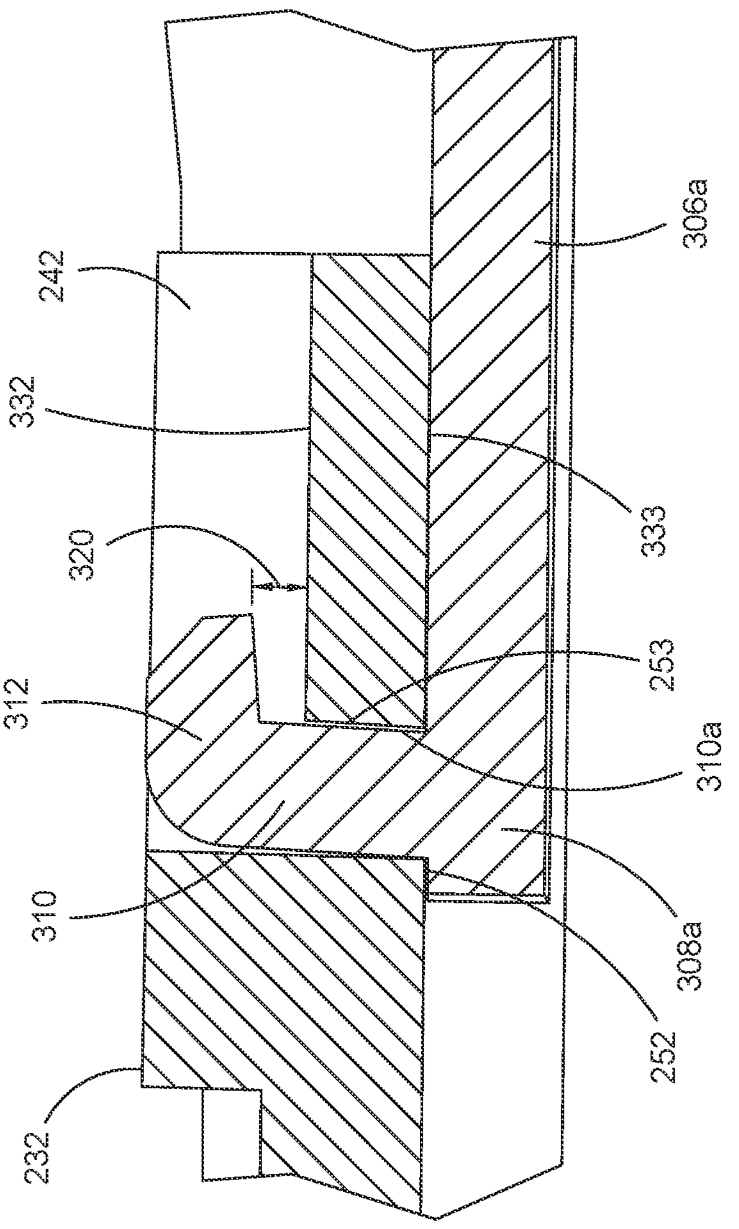
FIG. 3E illustrates a close-up, cross-sectional view of a clamping mechanism of the capsule mount assembly of FIG. 3A, according to certain embodiments.

As shown in FIG. 3E, each of the plurality of clamping structures 230 includes at least one of a plurality of clamping apertures 250 within a plurality of clamping grooves 240, e.g., first clamping groove 242, second clamping groove 244, third clamping groove 246, and fourth clamping groove 248, such as third clamping aperture 256 located within the third clamping groove 246 of the third clamping structure 236. The third clamping groove 246 recesses into the third clamping structure 236, but not through the third clamping structure 236 such that the groove support portion 233 of the third clamping structure 236 remains below the third clamping groove 246.

As illustrated in FIG. 3A, the first housing mount 306*a* includes a first protrusion 308*a*, the second housing mount 306*b* includes a second protrusion 308*b*, third housing mount 306*c* includes a third protrusion 308*c*, and fourth housing mount 306*d* includes a fourth protrusion 308*d*. In one example, the first protrusion 308*a* is configured to engage with, or "hook" into, the third clamping aperture 256 formed in the third clamping structure 236. The first protrusion 308*a* may include a longitudinal portion 310, which has a surface 310*a*, and a lateral portion 312 that, when engaged with the third clamping aperture 256, secure the third clamping structure 236 to the first housing mount 306*a*. For example, the lateral portion 312 may contact a bottom surface of the third clamping groove 246, e.g., bottom groove surface 332. Further, the longitudinal portion 310 may extend above the bottom groove surface 332 of the third clamping structure 236 such that there is a clearance distance 320 between the lateral portion 312 and the upper surface of the bottom groove surface 332. The clearance distance 320 is configured to allow a tolerance to secure the third clamping structure 236 to the first housing mount 306*a* while allowing the first housing mount 306*a* to engage with the third clamping aperture 256. Each of the second protrusion 308*b*, the third protrusion 308*c*, and the fourth protrusion 308*d* may be configured similarly to engage with the second clamping aperture 254 of the fourth clamping structure 238, the third aperture 256 of the first clamping structure 232, and the fourth aperture 258 of the second clamping structure 234, respectively.

In some embodiments, the protrusions 308 are positioned and spaced apart in an opposing relationship, such as the first protrusion 308*a* is positioned opposite the third protrusion 308*c*, and the second protrusion 308*b* is positioned opposite to the fourth protrusion 308*d*. As illustrated in FIGS. 3C-3D, the opposing protrusions 308 are each aligned along a common axis, such as the first clamping axis 260*a* or the second clamping axis 260*b*, so that when the clamping structures 230 are positioned on housing mounts (i.e., housing mounts 306*a*-306*d*) a desired preloaded tension can be placed across the microphone capsule suspension assembly 200 by the opposing protrusions. In some embodiments, the inner edge 253 (FIG. 2C) of the groove support portion 233 of each of the opposing clamping structures includes a dimension 235 that is less than a dimension formed between the surfaces 310*a* of opposing longitudinal portions 310 of the protrusions 308, such as the dimension between the surfaces 310*a* of the first protrusion 308*a* and the third protrusion 308*c*. In this case, the portions of the first mounting arm 220*a* and the second mounting arm 220*b* are in tension after installation onto the protrusions 308 of the housing 304.

Figure 4A:
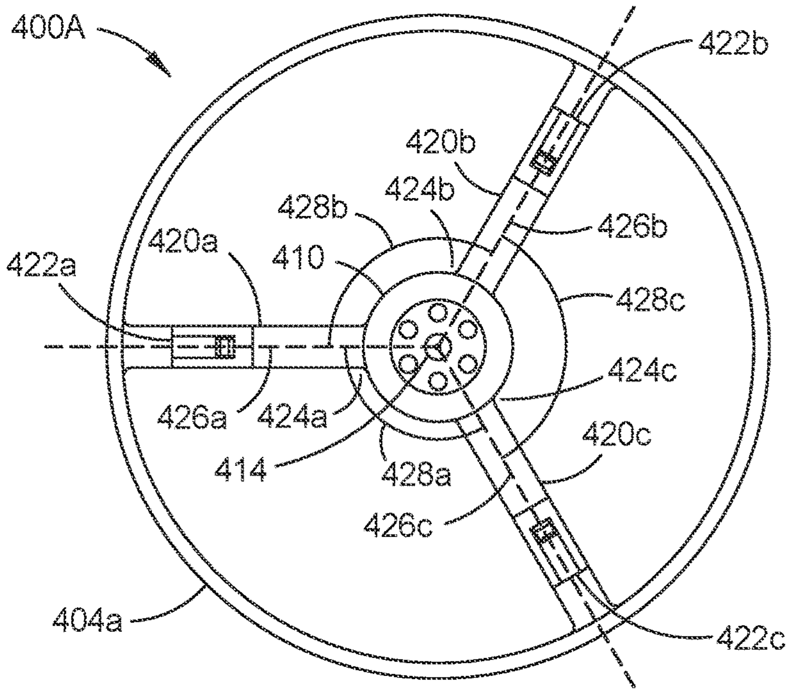
FIG. 4A illustrates a top view of an alternate version of a capsule mount assembly, according to certain embodiments.
Figure 4B:
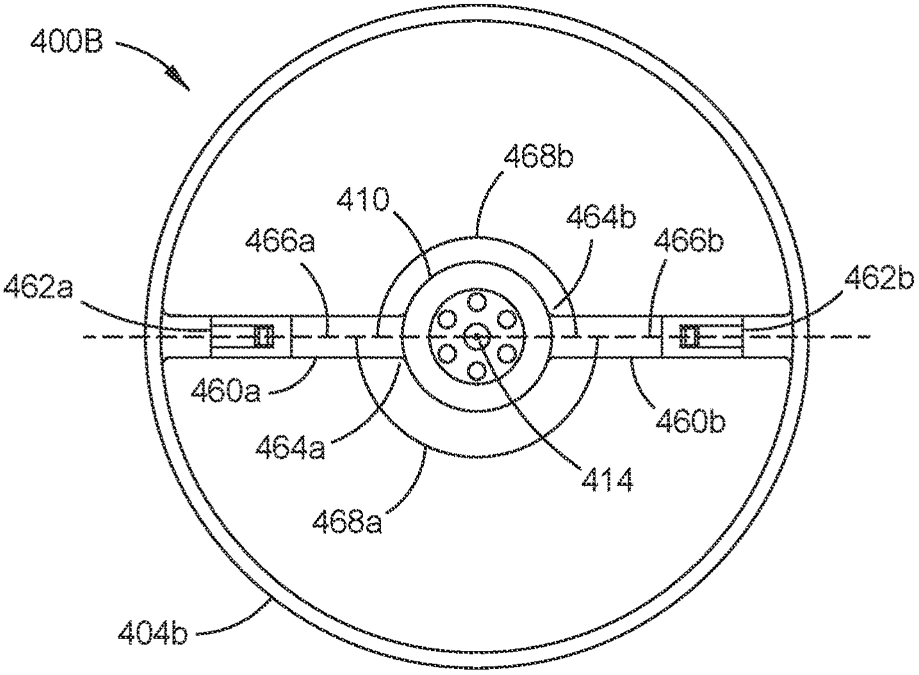
FIG. 4B illustrates a top view of an alternate version of a capsule mount assembly, according to certain embodiments.

FIGS. 4A and 4B illustrate alternative embodiments of the microphone capsule suspension assembly. Specifically, FIG. 4A illustrates a schematic, top view of a microphone capsule suspension assembly 400A including three mounting arms, e.g., first mounting arm 420*a*, a second mounting arm 420*b*, and a third mounting arm third mounting arm 420*c* and is configured similarly to the microphone capsule suspension assembly 200 of FIG. 2 unless expressly described. Each of the first mounting arm 420*a*, the second mounting arm 420*b*, and the third mounting arm 420*c* are configured similarly to first mounting arm 220*a* and second mounting arm 220*b* and include a first clamping structure 422*a* on the first mounting arm 420*a*, a second clamping structure 422*b* on the second mounting arm 420*b*, and a third clamping structure 422*c* on the third mounting arm 420*c*.

Each of the first mounting arm 420*a*, the second mounting arm 420*b*, and the third mounting arm 420*c* are coupled to a capsule mount 410 on a distal end opposite the first clamping structure 422*a*, the second clamping structure 422*b*, and the third clamping structure 422*c*, such as at first distal end 424*a*, second distal end 424*b*, and third distal end 424*c*, respectively. Each of the first mounting arm 420*a*, the second mounting arm 420*b*, and the third mounting arm 420*c* include an arm axis, e.g., first arm axis 426*a*, second arm axis 426*b*, and third arm axis 426*c*, that are coplanar and at an angle from each other, e.g., first angle 428*a*, second angle 428*b*, and third angle 428*c*, about a center axis 414. The first angle 428*a*, the second angle 428*b*, and the third angle 428*c* may be equal to each other, unequal to each other, or a combination of both, such that the sum of the first angle 428*a*, the second angle 428*b*, and the third angle 428*c* equals to 360°. For example, the first angle 428*a* and the third angle 428*c* may be equal to 110° and the second angle 428*b* may be equal to 140°. Alternatively, the first angle 428*a*, the second angle 428*b*, and the third angle 428*c* may all be equal to 120°. The first angle 428*a*, the second angle 428*b*, and the third angle 428*c* should be chosen to minimize rotation (e.g., pitch, yaw and roll) of the capsule mount 410 during operation of the microphone assembly 100.

In some embodiments, as shown in FIG. 4A, the first mounting arm 420*a*, the second mounting arm 420*b*, and the third mounting arm 420*c* each include a first end, which coincides with the first clamping structure 422*a* on the first mounting arm 420*a*, the second clamping structure 422*b* on the second mounting arm 420*b*, and the third clamping structure 422*c* on the third mounting arm 420*c*, respectively. The first mounting arm 420*a*, the second mounting arm 420*b*, and the third mounting arm 420*c* each also include central portion, which is positioned at the first distal end 424*a*, second distal end 424*b*, and third distal end 424*c* of each of the arms, respectively. The capsule mount 410 is coupled to the central portion of the first mounting arm 420*a*, the central portion of the second mounting arm 420*b*, and the central portion of the third mounting arm 420*c*, and thus the capsule mount 410 is configured to be supported by the first mounting arm 420*a*, the second mounting arm 420*b*, and the third mounting arm 420*c* and corresponding portions of the housing 404*a* that are together configured to support a microphone capsule.

FIG. 4B illustrates a schematic, top view of a microphone capsule suspension assembly 400B including two mounting arms coaxially aligned, e.g., first mounting arm 460*a* and second mounting arm 460*b*, and is configured similarly to the microphone capsule suspension assembly 200 of FIG. 2 unless expressly described. Each of the first mounting arm 460*a* and the second mounting arm 460*b* are configured similarly to first mounting arm 220*a* and second mounting arm 220*b*, e.g., same material properties, and include a first clamping structure 462*a* on the first mounting arm 460*a* and a second clamping structure 462*b* on the second mounting arm 460*b*.

Each of the first mounting arm 460*a* and the second mounting arm 460*b* are coupled to a capsule mount 410 on a distal end opposite the first clamping structure 462*a* and the second clamping structure 462*b*, e.g., at first distal end 464*a* and second distal end 464*b*. Each of the first mounting arm 460*a* and the second mounting arm 460*b* include an arm axis, e.g., first arm axis 466*a* and the second arm axis 466*b*, that are coplanar and at an angle from each other, e.g., first angle 468*a* and the second angle 468*b*, about a center axis 414. The first angle 468*a* and the second angle 468*b* may be equal to each other or unequal to each other, such that the sum of the first angle 468*a* and the second angle 468*b* equals to 360°. For example, the first angle 468*a* and the second angle 468*b* may be equal to 180° such that the first arm axis 466*a* and the second arm axis 466*b* are coaxially aligned.

In some embodiments, as shown in FIG. 4B, the first mounting arm 460*a*, and the second mounting arm 460*b* each include a first end, which coincides with the first clamping structure 462*a* on the first mounting arm 460*a* and the second clamping structure 462*b* on the second mounting arm 460*b*, respectively. The first mounting arm 460*a* and the second mounting arm 420*b* each also include central portion, which is positioned at the first distal end 464*a* and second distal end 464*b* of each of the arms, respectively. The capsule mount 410 is coupled to the central portion of the first mounting arm 460*a*, and the central portion of the second mounting arm 460*b*, and thus the capsule mount 410 is configured to be supported by the first mounting arm 460*a* and the second mounting arm 460*b*, and corresponding portions of the housing 404*b* that are together configured to support a microphone capsule.

The present disclosure provides a microphone capsule suspension assembly for a capsule in a condenser microphone that allows for improved dampening of unwanted vibrations, reducing noise in the produced acoustic signal of the microphone. The suspension includes a pair of mounting arms made of a material with a hardness that allows for effective damping while also preventing rotation of the capsule during use. The suspension includes a plurality of clamping mounts that serve as the only connection to the microphone housing, effectively isolating the capsule from all other components of the microphone. Isolating the capsule in this manner prevents undamped mechanical vibration from interfering with the capsule and reduces noise.

When introducing elements of the present disclosure or exemplary aspects or embodiment(s) thereof, the articles "a," "an," "the" and "said" are intended to mean that there are one or more of the elements.

The terms "comprising," "including" and "having" are intended to be inclusive and mean that there may be additional elements other than the listed elements.

The term "coupled" is used herein to refer to the direct or indirect coupling between two objects. For example, if object A physically touches object B and object B touches object C, the objects A and C may still be considered coupled to one another—even if objects A and C do not directly physically touch each other. For instance, a fist object may be coupled to a second object even though the first object is never directly in physical contact with the second object.

What is claimed is:

1. A microphone capsule suspension assembly, comprising:
- a capsule mount configured to support a microphone capsule;
- a pair of mounting arms, wherein
  - the pair of mounting arms comprise a first mounting arm and a second mounting arm,
  - the first mounting arm comprises a first end, a second end and a central portion disposed between the first end and the second end,
  - a first bend is disposed between the first end and the central portion of the first mounting portion,
  - a second bend is disposed between the second end and the central portion of the first mounting arm,
  - the second mounting arm comprises a third end, a fourth end and a central portion disposed between the third end and the fourth end,
  - a third bend is disposed between the third end and the central portion of the second mounting arm,
  - a fourth bend is disposed between the fourth end and the central portion of the second mounting arm,
  - the first bend and the third bend are aligned along a first clamping axis, the first clamping axis forming a first clamping angle less than 90 degrees from a first direction between the first end and the second end,
  - the capsule mount is coupled to, and disposed between, the central portions of the first mounting arm and the second mounting arm, and
  - the first end, second end, third end, and fourth end each comprise clamping structure, wherein the clamping structures are each configured to be supported by a portion of a housing that is configured to support the microphone capsule suspension assembly.

2. The microphone capsule suspension assembly of claim 1, wherein
- the central portion of the first mounting arm extends in the first direction between the first end and the second end,
- the central portion of the second mounting arm extends in the first direction between the third end and the fourth end, and
- an inner edge of the central portions of the first and the second mounting arms are tangentially coupled to the capsule mount.

3. The microphone capsule suspension assembly of claim 2, wherein the capsule mount comprises a cylindrical shaped body that has a central axis that is aligned at an angle to the first direction.

4. The microphone capsule suspension assembly of claim 1, wherein the clamping structures disposed at the first end and the third end are disposed on opposing sides of the capsule mount, and/or the clamping structures disposed at the second end and the fourth end are disposed on opposing sides of the capsule mount.

5. The microphone capsule suspension assembly of claim 4, wherein the clamping structures comprise a clamping aperture formed through each of the clamping structures, the clamping aperture configured to engage with a protrusion of a housing mount of the housing.

6. The microphone capsule suspension assembly of claim 5, wherein the clamping structures include a plurality of clamping grooves configured to engage with housing mounts of the housing.

7. The microphone capsule suspension assembly of claim 1, wherein the second mounting arm bend and fourth mounting arm bend are aligned along a second clamping axis, the second clamping axis forming a second clamping angle that is less than 90 degrees from the first direction.

8. The microphone capsule suspension assembly of claim 1, wherein the first mounting arm and the second mounting arm comprise butyl rubber.

9. The microphone capsule suspension assembly of claim 1, wherein the first mounting arm and the second mounting arm comprise a material that has a Shore A hardness of between about 20 and about 50.

10. The microphone capsule suspension assembly of claim 1, wherein the first mounting arm and the second mounting arm comprise a material that has a tensile modulus of between about 7.5 MPa and about 12 MPa.

11. The microphone capsule suspension assembly of claim 1, wherein the first mounting arm and the second mounting arm comprise a material that has a loss factor n of between about 0.5 and about 5.

12. A microphone assembly, comprising:
- a microphone capsule suspension assembly comprising:
  - a capsule mount comprising a capsule mount body, wherein the capsule mount body is configured to support a microphone capsule;
  - a first mounting arm coupled to a first portion of the capsule mount body disposed on a first side of the capsule mount body;
  - a second mounting arm coupled to a second portion of the capsule mount body disposed on a second side of the capsule mount body; and
  - clamping structures comprising a plurality of clamping grooves configured to engage with housing mounts of a housing, the clamping structures comprising:
    - a first clamping structure disposed on a first end of the first mounting arm;
    - a second clamping structure disposed on a second end of the first mounting arm;
    - a third clamping structure disposed on a first end of the second mounting arm; and
    - a fourth clamping structure disposed on a second end of the second mounting arm.

13. The microphone assembly of claim 12, wherein the first mounting arm and the second mounting arm are configured to be under a preloaded tension when positioned on housing mounts of a housing.

14. The microphone assembly of claim 12, the first mounting arm and the second mounting arm are aligned along an extension axis and are symmetric about the extension axis.

15. The microphone assembly of claim 12, wherein the first mounting arm and the second mounting arm comprise a material that has a Shore A hardness of between about 50 and about 20.

16. The microphone assembly of claim 12, further comprising:

a condenser microphone capsule disposed within the capsule mount body; and a housing comprising a plurality of housing mounts, wherein the microphone capsule suspension assembly further comprises:

a first clamping structure disposed on a first end of the first mounting arm;

a second clamping structure disposed on a second end of the first mounting arm;

a third clamping structure disposed on a first end of the second mounting arm; and a fourth clamping structure disposed on a second end of the second mounting arm, and the first clamping structure is coupled to a first housing mount of the plurality of housing mounts;

the second clamping structure is coupled to a second housing mount of the plurality of housing mounts;

the third clamping structure is coupled to a third housing mount of the plurality of housing mounts; and the fourth clamping structure is coupled to a fourth housing mount of the plurality of housing mounts.

17. A microphone capsule suspension assembly, comprising:

a capsule mount configured to support a microphone capsule; and a plurality of mounting arms, wherein the plurality of mounting arms comprise a first mounting arm and a second mounting arm, the first mounting arm comprises a first end and a first central portion, the second mounting arm comprises a second end and a second central portion, the capsule mount is coupled to the first central portion of the first mounting arm and the second central portion of the second mounting arm, and the first end of the first mounting arm and the second end of the second mounting arm each comprise a clamping structure, wherein the clamping structures are each configured to be supported by a portion of a housing that is configured to support the microphone capsule suspension assembly, the clamping structures comprise a clamping aperture formed through each of the clamping structures, the clamping aperture configured to engage with a protrusion of a housing mount of the housing, wherein there are at least two of the protrusions coaxially aligned with the first mounting arm and the second mounting arm; and the clamping structures include a plurality of clamping grooves, configured to engage with housing mounts of the housing.

18. The microphone assembly of claim 17, wherein the plurality of mounting arms further comprise:

a third mounting arm, wherein the third mounting arm comprises a third end and a third central portion, wherein the capsule mount is coupled to the third central portion of the third mounting arm, and the first end of the first mounting arm, the second end of the second mounting arm and the third end of the third mounting arm each comprise the clamping structure, wherein the clamping structures are configured to be supported by a portion of the housing that is configured to support the microphone capsule suspension assembly.

* * * * *